United States Patent [19]

Ward

[11] Patent Number: 4,845,881
[45] Date of Patent: Jul. 11, 1989

[54] FISHING APPARATUS

[76] Inventor: Harold D. Ward, P.O. Box 403, Toledo, Oreg. 97391

[21] Appl. No.: 262,747

[22] Filed: Oct. 26, 1988

[51] Int. Cl.⁴ ............................................... A01K 97/10
[52] U.S. Cl. ..................................... 43/21.2; 43/54.1; 43/55
[58] Field of Search .......................... 43/21.2, 55, 54.1

[56] References Cited

U.S. PATENT DOCUMENTS

| | | | |
|---|---|---|---|
| 3,423,869 | 1/1969 | Duerst | 43/55 |
| 3,603,019 | 9/1971 | Smeltzer | 43/21.2 |
| 3,659,369 | 5/1972 | Hermanson | 43/21.2 |
| 3,667,708 | 6/1972 | Smeltzer | 43/21.2 |
| 3,745,692 | 7/1973 | McGee | 43/21.2 |
| 4,095,364 | 6/1978 | Prine | 43/21.2 |
| 4,311,262 | 1/1982 | Morin | 43/21.2 |
| 4,323,181 | 4/1982 | Spasoff | 43/21.2 |
| 4,353,182 | 10/1982 | Junkas | 43/54.1 |

Primary Examiner—Gene P. Crosby
Attorney, Agent, or Firm—Leon Gilden

[57] ABSTRACT

A fishing apparatus is set forth including a bucket-like container formed with a pivotal handle attached to diametrically opposed sides thereof. The container includes a threadedly securable lid to secure contents within the bucket wherein the lid is reversibly positionable on the bucket to provide a cushion seat for use by an individual. The bucket further contains an upwardly depending conduit integrally formed to a side wall of the bucket to accept a pole therewithin. Furthermore when the bucket is unattended, side mounted legs are pivoted from a first position to a second downward position wherein they depend forwardly and downwardly from the bucket to secure the bucket against tipping in the event of a fish strike. The interior of the bucket is provided with a series of hooks for securement of fish thereon.

9 Claims, 1 Drawing Sheet

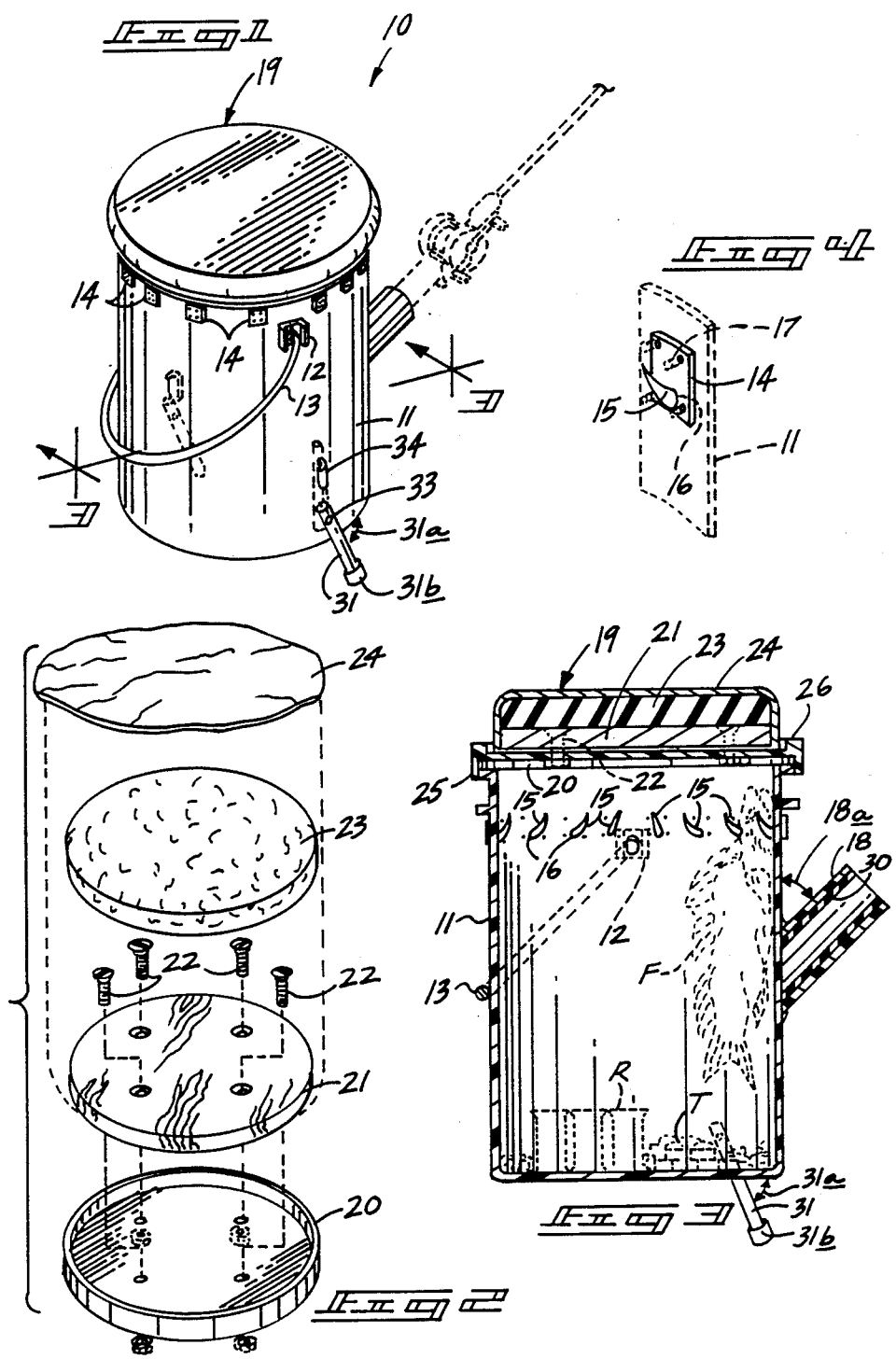

FISHING APPARATUS

BACKGROUND OF THE INVENTION

1. Field of the Invention

The field of invention relates to fishing accessories, and more particularly pertains to a new and improved fishing apparatus that enables the securement of a pole thereto and further includes apparatus to prevent tipping of the bucket during a fish strike.

2. Description of the Prior Art

The use of various pole holders and seats to accommodate fishermen during the act of fishing are well known in the prior art. Prior art patents have conventionally included various means to secure poles, but have heretofore not been provided with the particular structure set forth by the instant invention to deter the bucket from tipping during a fish strike when the bucket is left unattended. For example, U.S. Pat. No. 3,659,369 to Hermanson sets forth a bucket provided with a plurality of outwardly extending brackets to secure a pole but as is typical of the prior art, does not provide an anti-tipping mechanism in association with the bucket. Further, the apparatus set forth by the Hermanson patent does not provide for a cushion seat nor the use of fish accommodating hooks positioned within the bucket.

U.S. Pat. No. 3,667,708 to Smeltzer sets forth a combination fishing rod holder and flashlight attachment wherein the arrangement is securable to a bucket by means of a circumferential band. As in other prior art, the patent does not provide for an anti-tipping device nor other combinations such as a padded seat and the like, as set forth with the instant invention.

U.S. Pat. No. 4,095,364 to Prine sets forth a fishing rod holder associated with a tackle box wherein an angulated bracket arrangement is securable to a tackle box to enable the holding of a pole thereon. The patent is of interest relative to the background of prior art illustrating a further pole holder.

U.S. Pat. No. 4,311,262 to Morin sets forth a caddy for the securement of various fishing rods and reels thereon in a matrix of openings formed through a base portion of the apparatus to maintain the poles vertically.

U.S. Pat. No. 4,323,181 to Spasoff sets forth a belt mounted tackle carrier including various compartments for holding of fishing accessories and the like with a separate compartment for the holding of a pole without the user thereof manually grasping the pole.

As such, it may be appreciated that there is continuing need for a new and improved fishing apparatus that addresses the problems of versatility in application and ease of use, and in this respect the present invention substantially fulfills this need.

SUMMARY OF THE INVENTION

In view of the foregoing disadvantages inherent in the known types of fishing apparatus now present in the prior art, the present invention provides a fishing apparatus wherein the same may be portably transported for containment of various fishing items therein the thereafter easily and readily positioned for securement of a fishing pole to maintain same against tipping during a fish strike. As such, the general purpose of the present invention, which will be described subsequently in greater detail, is to provide a new and improved fishing apparatus which has all the advantages of the prior art fishing apparatus and none of the disadvantages.

To attain this, the present invention includes a container of a generally cylindrical configuration formed with a lid with a cushion-like surface that is resiliently securable within the container when the cushion is in a downward orientation due to the friction fitting of the cushion with the container walls, and positionable over a perimeter ridge of the container when the lid is reversed to provide a cushion seat for a user. Further, the apparatus includes an upwardly angled tubular fish holder and forwardly pivotal legs to maintain the bucket against tipping during a fish strike.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved fishing apparatus which has all the advantages of the prior art fishing apparatus and none of the disadvantages.

It is another object of the present invention to provide a new and improved fishing apparatus which may be easily and efficiently manufactured and marketed.

It is a further object of the present invention to provide a new and improved fishing apparatus which is of a durable and reliable construction.

An even further object of the present invention is to provide a new and improved fishing apparatus which is susceptible of a low cost of manufacture with regard to both materials and labor, and which accordingly is then susceptible of low prices of sale to the consuming public, thereby making such fishing apparatus economically available to the buying public.

Still yet another object of the present invention is to provide a new and improved fishing apparatus which provides in the apparatuses and method of the prior art some of the advantages thereof, while simultaneously overcoming some of the disadvantages normally associated therewith.

Still another object of the present invention is to provide a new and improved fishing apparatus wherein the same is convertible from a secured container to a cushioned seat for a user while including a pole holder extending upwardly and angularly away from the container, and further including forwardly pivotal legs to orient the apparatus against tipping during a fish strike.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an isometric illustration of the instant invention.

FIG. 2 is an isometric expanded illustration of the seat arrangement of the instant invention.

FIG. 3 is an orthographic illustration taken along the lines 3—3 of FIG. 1 in the direction indicated by the arrows.

FIG. 4 is an isometric illustration illustrating an internal fish holding hook positioned about an upper interior surface of the container.

DESCRIPTION OF THE PREFERRED EMBODIMENT

With reference now to the drawings, and in particular to FIGS. 1 to 4 thereof, a new and improved fishing apparatus embodying the principles and concepts of the present invention and generally designated by the reference numeral 10 will be described.

More specifically, it will be noted that the fishing apparatus 10 essentially comprises a container 11 of cylindrical configuration, but in fact may be of various cross-sectional configurations, i.e., square, rectangular, etc. A plurality of diametrically opposed "U" shaped brackets 12 are integrally secured to upper portions of the cylindrical wall of the container 11 with the legs of the "U" shaped bracket vertically oriented and pivotally containing a handle 13 therebetween spanning the distance between the two brackets 12.

Reference to FIGS. 1, 3, and 4 illustrate a circumferential series of backing plates 14 formed with integrally hooks 15 thereon projecting upwardly and directed through a series of apertures 16 formed through an upper portion of the cylindrical wall of the container 11 within a circular array, but in fact the hooks 15 may be offset relative to one another in that they project interiorly of the container 11 for securement of a fish "F" thereon for storage of the fish by a fisherman. The backing plates 14 are secured to the container 11 by a matrix of threaded fastener 17 directed interiorly and capturing the wall of the container 11 and sandwiching it on the wall between the head of the threaded fastener 17 and the backing plate 14. The backing plate 14 being positioned exteriorly of the container prevents a hook 15 from being disjoined from the wall of the container 11.

A tubular fishing pole holder 18 is integrally secured to and directed upwardly and at an acute angle between the holder 18 and the wall of the container 11, as indicated by arrow 18a. Further, a resilient liner 30 is formed onto the interior of the holder 18 to frictionally secure an associated handle of a fishing pole therein, such as illustrated in FIG. 1 for example.

The apparatus further includes a lid 19 including a cup-shaped closure 20 formed with a perimeter flange 10a extending orthogonally to either side of the planar central web of the cup shaped closure 20. A reinforcement disk 21 is interfitted within the cup-shaped closure 20 interiorly of the flange 20a and is secured by a plurality of disk fasteners 22 to the closure 20. A foam pad 23 is adhesively secured to the disk 21 with a water-proof vinyl-like covering 24 in surrounding relationship to the foam pad 23 and reinforcement disk 21 to prevent moisture access to the foam pad 23 or disk fastener 22. The downwardly extending portion of the perimeter flange 20a overlies a container ridge 26 integrally and outwardly formed to the upper terminal edge of the container 11 to prevent unwanted sliding of the lid 19 when positioned on the container 11 to be used as a seat, as illustrated in FIG. 3. FIG. 3 further illustrates the positioning of refreshments "R" and fishing tackle "T" within the interior of the container 11 wherein the hooks 15 maintain the various fish above the floor of the container and enables the use of the container floor for such storage.

When the container 11 is left unattended, a plurality of diametrically opposed pivotal legs 31 secured to the container wall 11 by pivot axles 33 may be disposed from a vertical upward position, illustrated in phantom in FIG. 1, to a second forward angular position defining an acute angle 31a between the container floor and the leg 31. The leg 31 is formed with a forward resilient foot 31b to provide a friction surface when the apparatus is disposed upon a friction surface, otherwise the feet may be positioned within associated underlying turf to secure the container in position. The feet 31 are maintained in a first upward vertically position by a spring clip 34 and are maintained in the forward angular orientation by an "L" shaped bracket integrally secured to diametrically opposed bottommost portions of the container wall 11. In this manner, the container 11 will assume a rearwardly directed disposition upon the forward extension of the legs 31 to prevent tippage of the container upon a fish strike when a fishing pole is positioned within the holder 18.

It should also be noted that the external diameter of the padded seat defined by the vinyl covering 24 is substantially equal to or somewhat greater than the interior diameter of the container 11 whereupon reversing the lid 19 to interfit the padded seat materially thereof results in a friction fit of the vinyl-like covering 24 and foam pad 23 within the container 11 and thereby provides securement of the lid 19 to the container 11 during transport of the apparatus 20.

It should be further noted that the pivot axle connections 33 are positioned forwardly of the container 11 proximate the fishing pole holder 18 or both positioned in a forward semi-cylindrical section of the container 11 wherein the forward section is defined by the medial placement of the fishing pole holder 18 to provide an effective anti-tipping apparatus associated with the container 11.

As to the manner of usage and operation of the instant invention, the same should be apparent from the above description and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and al equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimd as being new and desired to be protected by Letters Patent of the United States is as follows:

1. A fishing apparatus providing selective securement of a fishing pole, providing storage, and a seat comprising, open top container including a planar lid wherein said lid includes a padded seat secured to a first planar surface of said lid wherein said padded seat is of a diameter substantially equal to the interior diameter of the container to effect a friction fit of the padded seat when positioned within the container, wherein the second planar surface of said lid overlies a perimeter ridge formed outwardly of said container, and a tubular conduit integrally secured to a vertical wall of said container at an acute angle thereto, and tilt prevention means secured adjacent a lower terminal portion of a vertical wall of said container to prevent tippage of said container during a fish strike.

2. A fishing apparatus as set forth in claim 1 wherein said tilt prevention means includes a plurality of legs pivotally secured to said container wall.

3. A fishing apparatus as set forth in claim 2 wherein said plurality of legs are pivotally secured to a lowermost portion of said container wall proximate the tubular conduit.

4. A fishing apparatus as set forth in claim 3 wherein a spring bracket overlying a pivot axis of each of the legs secures each leg in a second vertical position relative to said container wall.

5. A fishing apparatus as set forth in claim 4 wherein said lid includes a flange extending orthogonally relative to said lid and extending beyond each planar surface of said lid.

6. A fishing apparatus as set forth in claim 5 wherein a plurality of hooks extend through apertures formed in said container wall for securement of fish thereon.

7. A fishing apparatus as set forth in claim 6 wherein said hooks include an integral plate, and said integral plate is positioned exteriorly of said container wall and fastened by means of threaded fasteners to sandwich such container wall between said fasteners and each plate.

8. A fishing apparatus as set forth in claim 7 wherein a handle is secured to "U" shaped brackets positioned diametrically opposed to one another for pivotal securement of said handle thereto.

9. A fishing apparatus as set forth in claim 8 wherein each leg includes a friction tip secured at a forwardmost terminal end thereof remote from said pivot axis.

* * * * *